(12) United States Patent
Nakamura et al.

(10) Patent No.: US 7,986,063 B2
(45) Date of Patent: Jul. 26, 2011

(54) CYLINDRICAL COIL AND CYLINDRICAL MICROMOTOR USING THE SAME

(75) Inventors: Kazuya Nakamura, Tokyo (JP); Yoshihito Hiyama, Tokyo (JP); Nobuo Imaizumi, Tokyo (JP)

(73) Assignee: Namiki Seimitsu Houseki Kabushiki Kaisha (JP)

(*) Notice: Subject to any disclaimer, the term of this patent is extended or adjusted under 35 U.S.C. 154(b) by 196 days.

(21) Appl. No.: 11/913,794

(22) PCT Filed: May 26, 2006

(86) PCT No.: PCT/JP2006/310517
§ 371 (c)(1),
(2), (4) Date: Nov. 7, 2007

(87) PCT Pub. No.: WO2006/126662
PCT Pub. Date: Nov. 30, 2006

(65) Prior Publication Data
US 2009/0079277 A1    Mar. 26, 2009

(30) Foreign Application Priority Data
May 27, 2005  (JP) ................................. 2005-156207

(51) Int. Cl.
*H02K 1/04*    (2006.01)
*H02K 5/00*    (2006.01)

(52) U.S. Cl. .................... 310/40 MM; 310/43; 310/179; 310/180; 310/216.002; 310/216.003; 29/596

(58) Field of Classification Search .................. 310/179, 310/180, 40 MM, 43, 216.002, 216.003; 29/596; *H02K 1/04, 5/00*
See application file for complete search history.

(56) References Cited

U.S. PATENT DOCUMENTS

| | | | | |
|---|---|---|---|---|
| 3,011,247 | A * | 12/1961 | Hanlet | 29/602.1 |
| 3,466,580 | A * | 9/1969 | Bull | 335/213 |
| 3,656,015 | A * | 4/1972 | Gillum | 310/13 |
| 3,723,779 | A * | 3/1973 | Gillum | 310/13 |
| 3,924,466 | A * | 12/1975 | Medlar | 73/861.12 |
| 4,271,370 | A * | 6/1981 | DiMeo | 310/266 |
| 4,639,708 | A * | 1/1987 | Weatherly | 336/200 |
| 5,084,311 | A * | 1/1992 | Liu et al. | 428/35.8 |
| 5,113,100 | A * | 5/1992 | Taghezout | 310/40 MM |
| 6,111,329 | A * | 8/2000 | Graham et al. | 310/12.02 |
| 6,568,065 | B2 * | 5/2003 | Graham et al. | 29/596 |
| 6,864,613 | B1 * | 3/2005 | Graham et al. | 310/195 |

(Continued)

FOREIGN PATENT DOCUMENTS

JP        62-185555        8/1987

(Continued)

OTHER PUBLICATIONS

International Search Report for PCT/JP2006/310517 Dated Aug. 8, 2006

*Primary Examiner* — Quyen Leung
*Assistant Examiner* — John K Kim
(74) *Attorney, Agent, or Firm* — Studebaker & Brackett PC; Donald R. Studebaker

(57) ABSTRACT

A high-precision cylindrical coil having a high-precision fine coil pattern and a high mechanical precision such as fine roundness and no axial runout, and a cylindrical micrometer using the cylindrical coil are provided.
In a cylindrical coil, a plurality of layers of coil patterns formed by filling the coil pattern grooves formed on a cylindrical substrate with a conductor and a plurality of insulating layers coating the cylindrical substrate are formed, the layers of coil patterns are electrically interconnected to each other by filling a through-hole formed by performing a hole forming process with a conductor, and the outmost layer is made of an insulating material.

8 Claims, 4 Drawing Sheets

U.S. PATENT DOCUMENTS

| | | | |
|---|---|---|---|
| 2005/0064054 A1 | 3/2005 | Kasumi | |
| 2005/0072967 A1* | 4/2005 | Kornilovich et al. | 257/9 |
| 2006/0258163 A1* | 11/2006 | Ohashi et al. | 438/735 |
| 2009/0079277 A1* | 3/2009 | Nakamura et al. | 310/43 |

FOREIGN PATENT DOCUMENTS

| | | |
|---|---|---|
| JP | 2003-274619 | 9/2003 |
| JP | 2004-007938 | 1/2004 |
| JP | 2005-101201 | 4/2005 |

* cited by examiner

CYLINDRICAL COIL AND CYLINDRICAL MICROMOTOR USING THE SAME

FIELD OF THE INVENTION

The present invention relates to a cylindrical coil having a extremely small diameter and a fine coil pattern and a cylindrical micromotor using the same.

BACKGROUND ART

Recently, as high-performance instrument having a built-in actuator has been widely used in fields of medical instrument, analytical instrument, or micro-machine, a small-sized micromotor has been demanded.

In the implementation of the micromotor having a small size, particularly, a small diameter, a coil built in the micrometer is necessarily formed in a small size and finely.

Generally, the coil is formed by winding a copper line which is coated with an insulator such as polyurethane around a core having a slot. Otherwise, the coil may be formed as a coreless coil. Namely, a self-fusing copper line is prepared by additionally forming a fusing layer on the outmost layer of the insulator-coated copper line. The coreless coil is obtained by forming the self-fusing copper line in a shape of cup or bell. In order to implement a cylindrical micromotor having a small diameter, the coreless coil, that is, a coil having no core is very suitable.

Conventionally, as shown in FIG. 3, a Kodak type winding method or a Faulhaber type winding method is used to manufacture the cup-shaped coreless coil. In Japanese Patent Application Laid-Open No. 2004-007938, there is disclosed a parallel coil which is formed by arraying a plurality of the coils that is manufactured according to the aforementioned method in order to minimize current consumption and improve torque characteristic.

DISCLOSURE OF THE INVENTION

Problems to be Solved

However, in case of forming the coreless coil by using the self-fusing copper line, wire lines basically need to be arrayed. Therefore, it is difficult to form a cylindrical micromotor having an outer diameter of 1.5 mm or less, particularly, 1.0 mm or less due to the following reasons.

Firstly, since a shape of the coil tends to be deformed during the formation of the coil, mechanical precision such as roundness and straightness deteriorates. In addition, due to a limitation to manufacturing of the self-fusing copper wire line, it is difficult to form a wire line having a diameter of 0.02 mm or less.

secondly, as shown in FIG. 4, there is a DC brushless motor 27, in which an inner rotor including a cylindrical magnet 21 and a shaft 22 which penetrates the center of the cylindrical magnet is rotatably supported by a shaft bearing 25 at the center of the shaft for flanges 24 disposed at both openings of a cylindrical housing case 23, and the rotation of the inner rotor is driven by a rotational magnetic field generated from a field coil 26 fixed on an inner surface of the housing case 23 when the field coil 26 is powered on.

In a coil having a poor mechanical precision such as roundness and straightness, since the coil may interfere with the magnet, there is a need to ensure a wide air gap, that is, an interval between the magnet 21 and the field coil 26. Accordingly, there is also a need to ensure a wide magnetic gap between an inner surface of the housing case 23 and an outer surface of the magnet 21. For this reason, a torque generating efficacy deteriorates, and the motor cannot be suitably formed in a small size. In addition, as the outer diameter of the motor becomes smaller, the air gap cannot be decreased without a manufacturing limitation. Since a predetermined air gap needs to be ensured under the manufacturing limitation thereof, the influence is more increased in the implementation of the motor having a small diameter.

In consideration of the problems, the present invention provides a high-precision cylindrical coil having a high-precision fine coil pattern and a high mechanical precision such as roundness and straightness, and a cylindrical micrometer using the cylindrical coil.

Means for Solving the Problems

According to the invention disclosed in Claim 1, there is provided a cylindrical coil in which a coil pattern is directly formed by forming a coil pattern groove on a cylindrical substrate and filling the coil pattern groove with a conductor.

According to the invention disclosed in Claim 2, in the cylindrical coil according to Claim 1, the coil pattern is directly formed by forming the coil pattern groove on the cylindrical substrate using a nano-imprinting method and filling the coil pattern groove with the conductor.

According to the invention disclosed in Claim 3, in the cylindrical coil according to Claim 1 or 2, a plurality of layers of coil patterns formed by filling the coil pattern grooves formed on the cylindrical substrate with a conductor and a plurality of insulating layers coating the cylindrical substrate are formed, the layers of coil patterns are electrically interconnected to each other by filling a through-hole formed by performing a hole forming process with a conductor, and the outmost layer is made of an insulating material.

According to the invention disclosed in Claim 4, in the cylindrical coil according to any one of Claims 1 to 3, the coil pattern is 20 μm or less.

According to the invention disclosed in Claim 5, there is provided a cylindrical micrometer having the cylindrical coil according to any one of Claims 1 to 4.

The nano-imprinting method is a fine molding process technique, in which a mold having a fine convex-concave is pressed on a to-be-processed material such as a resin and a shape of the convex-concave is transferred to the material. The nano-imprinting method is classified into a thermal type nano-imprinting method and a light-cured type nano-imprinting method. In the thermal type nano-imprinting method, a mold is set, the mold and a to-be-processed material made of a thermoplastic resin are heated up over a glass transition temperature, and the mold is pressed on the to-be-processed material for a predetermined time interval, the mold and the to-be-processed material are cooled down below the glass transition temperature, and the mold is peeled off from the to-be-processed material, so that the fine convex-concave of the mold is transferred to the to-be-processed material. In the light-cured type nano-imprinting method, a mold is filled with a to-be-processed material made of a light-cured resin, for example, UV beam is illuminated on the to-be-processed material through the mold to cure the light-cured resin, and the mold is peeled off, so that the fine convex-concave of the mold is transferred to the to-be-processed material.

According to the thermal type nano-imprinting method, a degree of freedom in selection of the to-be-processed material having a glass transition temperature is high, a degree of freedom in a shape of the mold is high, and a shape having a high aspect ratio can be formed. However, throughput may be lowered due to the time interval taken in the heating and cooling processes. Due to a difference in temperature, a size may be changed, and a pattern transfer precision may be deteriorated. Due to thermal expansion, an alignment precision may be deteriorated.

In the light-cured nano-imprinting method, the throughput is high as compared to that of the thermal type method, and a change in size due to a difference in temperature can be avoided. Since a mold transmitting UV beam is used, position alignment can be performed after the transmission of the mold. However, since a material of the mold needs to transmit the UV beam, there is a limitation to the material of the mold.

The nano-imprinting method needs to be selectively used in consideration of the advantages and disadvantages of the thermal type and the light-cured type.

Effect of the Invention

In the cylindrical coil according to the present invention, the coil pattern is directly formed on a surface of the cylindrical substrate, so that a process (rolling process) of rolling a sheet-shaped coil in a cylindrical shape can be omitted. For this reason, in case of manufacturing a fine cylindrical coil having a high aspect ratio, it is possible to increase a strength of the sheet-shaped coil due to a size effect of the sheet-shaped coil that a width/thickness is lowered and to easily solve the problems such as occurrence of a droplet shape (non-circular shape) of a cross section during the rolling process, deterioration in mechanical precision such as roundness and straightness, and disconnection of a wire line, particularly, a longitudinal wire line due to a shearing stress caused from a difference of inner and outer diameters.

According to the present invention, since the cylindrical coil can be maintained to have a high mechanical precision such as roundness and straightness, it is possible to reduce an air gap and a magnetic gap in the implementation of a micromotor having a small size and a small diameter by using the cylindrical coil. Therefore, permeance coefficient is increased, so that a magnetic efficiency can be improved. As a result, a torque constant or the like can be improved.

In addition, since a fine coil pattern groove can be formed by using the nano-imprinting method, the groove can be directly filled with a conductor to form a coil pattern, so that it is possible to form a fine coil pattern.

In addition, a plurality of coil pattern layers and a plurality of insulating layers are formed, and the layered coil patterns can be electrically interconnected to each other with a conductor filled in a through-hole formed by performing a hole forming process with a laser, so that it is possible to form a multi-layered cylindrical coil. In addition, the number of windings can be increased, so that it is possible to improve a torque constant or the like.

A width of the coil pattern of the cylindrical coil is formed to be 20 μm or less, so that a fine coil pattern can be formed to have a coil pattern width which is narrower than the width limitation of wire line of a conventional coil. Therefore, it is possible to implement a cylindrical coil having a smaller size and a smaller diameter.

In addition, by using the cylindrical coil according to the present invention to a cylindrical micromotor, it is possible to implement a cylindrical micrometer having a small size and a small diameter.

BEST MODE FOR CARRYING OUT THE INVENTION

FIG. 1 is a schematic view illustrating a process of forming a coil pattern groove by using a nano-imprinting method according to an embodiment of the present invention. In the embodiment, the aforementioned thermal-type nano-imprinting method is used.

In the thermal-type nano-imprinting method, a mold 2 which has a arc-shaped cross section and in which a fine protrusion 3 having a shape of a coil pattern is formed on an inner surface thereof is set. The mold 2 together with a cylindrical substrate 1 made of an insulating thermoplastic resin is heated up over a glass transition temperature of the cylindrical substrate 1. The mold 2 is pressed on the cylindrical substrate 1 for a predetermined time interval. The cylindrical substrate 1 and the mold 2 are cooled down below the glass transition temperature. The mold 2 is peeled off from the cylindrical substrate 1.

FIGS. 2(a) to 2(l) are schematic views illustrating a process of forming a cylindrical coil according to the present invention.

Firstly, the cylindrical substrate 1 made of an insulating thermoplastic resin with a central bar (not shown) inserted into an inner central portion thereof is set (FIG. 2(a)). Next, the coil pattern groove 5 is formed on an outer surface of the cylindrical substrate by using the aforementioned method, so that a cylindrical substrate 4 is obtained (FIG. 2(b)).

Subsequently, an electroless plating 6 of copper (Cu) or the like is formed on the outer surface of the cylindrical substrate 4 (FIG. 2(c)). The surface of the resulting product is polished down to the surface of the cylindrical substrate 4, so that a cylindrical substrate 8 having a coil pattern 7 formed by filling the coil pattern groove 5 (formed by using the nano-imprinting method) with the electroless plating, that is, a conductor is obtained (FIG. 2(d)).

The outer surface of the cylindrical substrate 8 is coated with an insulating thermoplastic resin, so that a cylindrical substrate 9 is obtained (FIG. 2(e)). Next, a coil pattern groove 10 is formed on the surface of the cylindrical substrate 9 by using the nano-imprinting method, so that a cylindrical substrate 11 is obtained (FIG. 2(f)). Similarly, an electroless plating 12 is formed on the outer surface of the cylindrical substrate 11 (FIG. 2(g)). The surface of the resulting product is polished down to the surface of the cylindrical substrate 11, so that a cylindrical substrate 14 having a coil pattern 13 made of a conductor is obtained (FIG. 2(h)).

Subsequently, a through-hole 15 is formed on a portion of the coil pattern 13 in a radial direction of the cylindrical substrate by performing a hole forming process with a laser or other methods, so that a cylindrical substrate 16 is obtained (FIG. 2(i)). In the process, the through-hole 15 is formed to penetrate down to the coil pattern 7. Similarly, an electroless plating 17 is formed on the outer surface of the cylindrical substrate 16 (FIG. 2(j)).

The surface of the resulting product is polished down to the surface of the cylindrical substrate 16, so that a cylindrical substrate 19 having a longitudinal wire line 18 formed by filling the through-hole 15 with a conductor is obtained (FIG. 2(k)). The outer surface of the cylindrical substrate 19 is coated with an insulating thermoplastic resin, so that a cylindrical substrate 20 is obtained (FIG. 2(l)). The aforementioned processes are repeatedly performed.

The coil patterns 7 and 13 are appropriately connected to a power supply wire (not shown) and the like according to the use, so that a multi-layered cylindrical coil can be formed.

As described above, the coil patterns and the insulating thermoplastic resins are directly formed on the surfaces of the cylindrical substrate, so that a cylindrical coil having a good mechanical precision can be obtained. In addition, the layered coil patterns are interconnected to each other with the conductor filled in the through-hole, so that three-dimensional wire lines can be formed. In addition, a cylindrical coil in which disconnection of a wire line, particularly, a longitudinal wire lines does not easily occur can be formed.

In the embodiment, the electroless plating process is used as a process of filling the coil pattern groove (formed by using the nano-imprinting method) with a conductor, but the present invention is not limited thereto.

In the embodiment, the nano-imprinting method is used as a process of forming the coil pattern groove, but the present invention is not limited thereto. A cutting process or the like may be used. However, the nano-imprinting method is preferably used as the process of forming the coil pattern groove.

By constructing a micromotor with the aforementioned cylindrical coil, it is possible to manufacture a micromotor having a smaller size and smaller diameter.

REFERENCE NUMERALS

Figure 1:
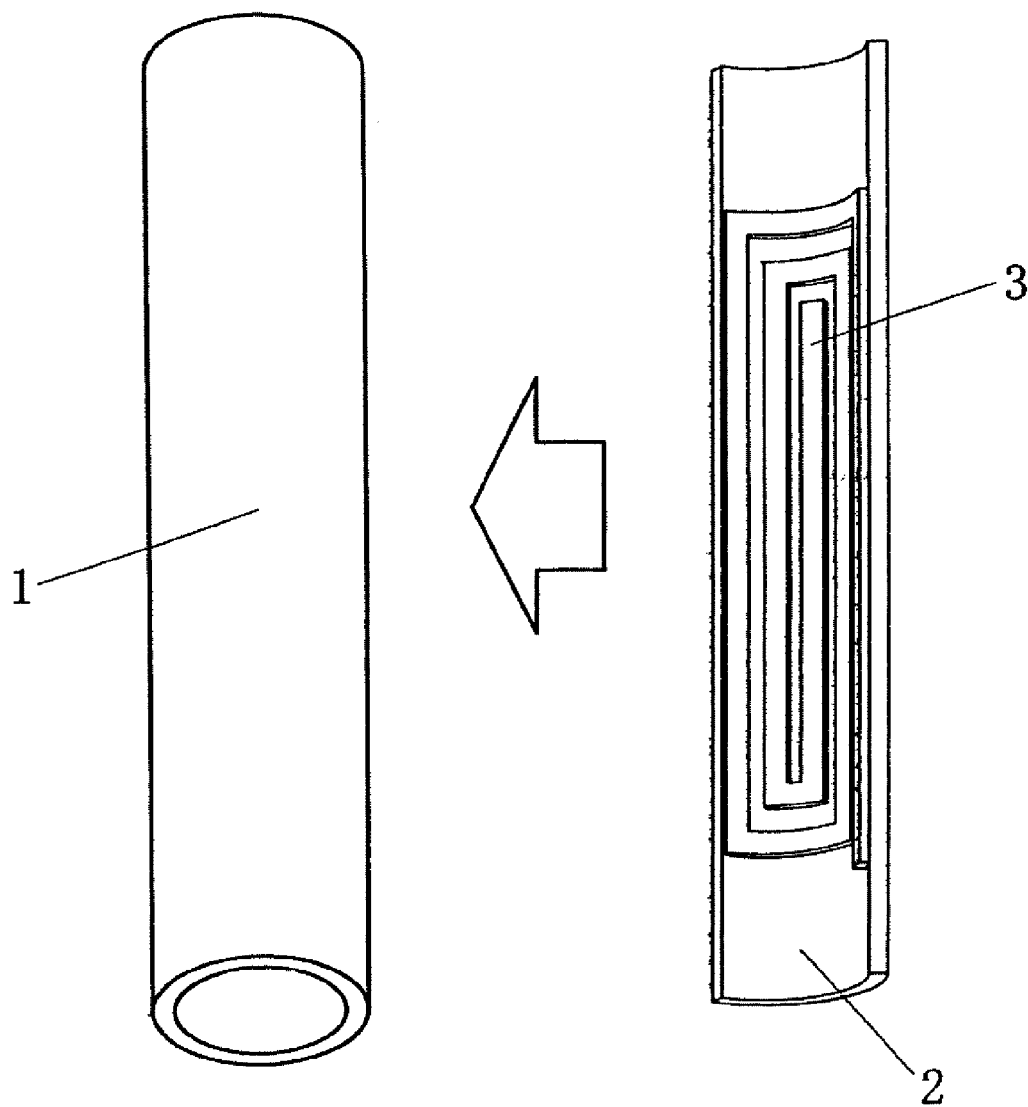
FIG. 1 is a view for explaining a process of forming a coil pattern groove by using a nano-imprinting method according to the present invention.
Figure 2:
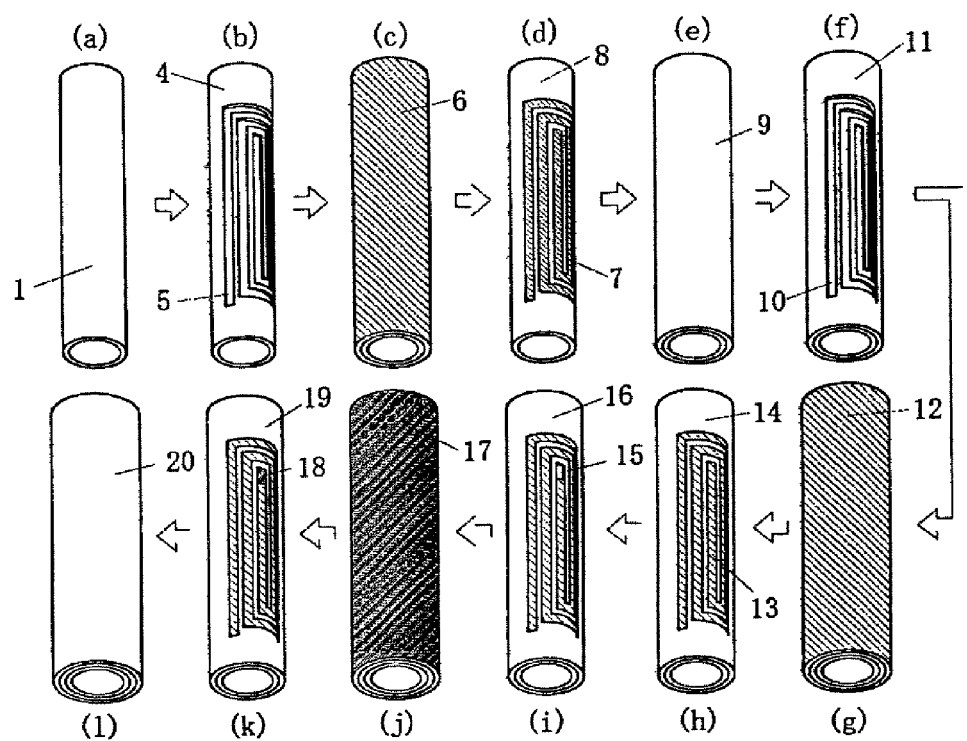
FIG. 2 is a schematic view illustrating a process of forming a coil of a cylindrical micromotor according to the present invention.
Figure 3:
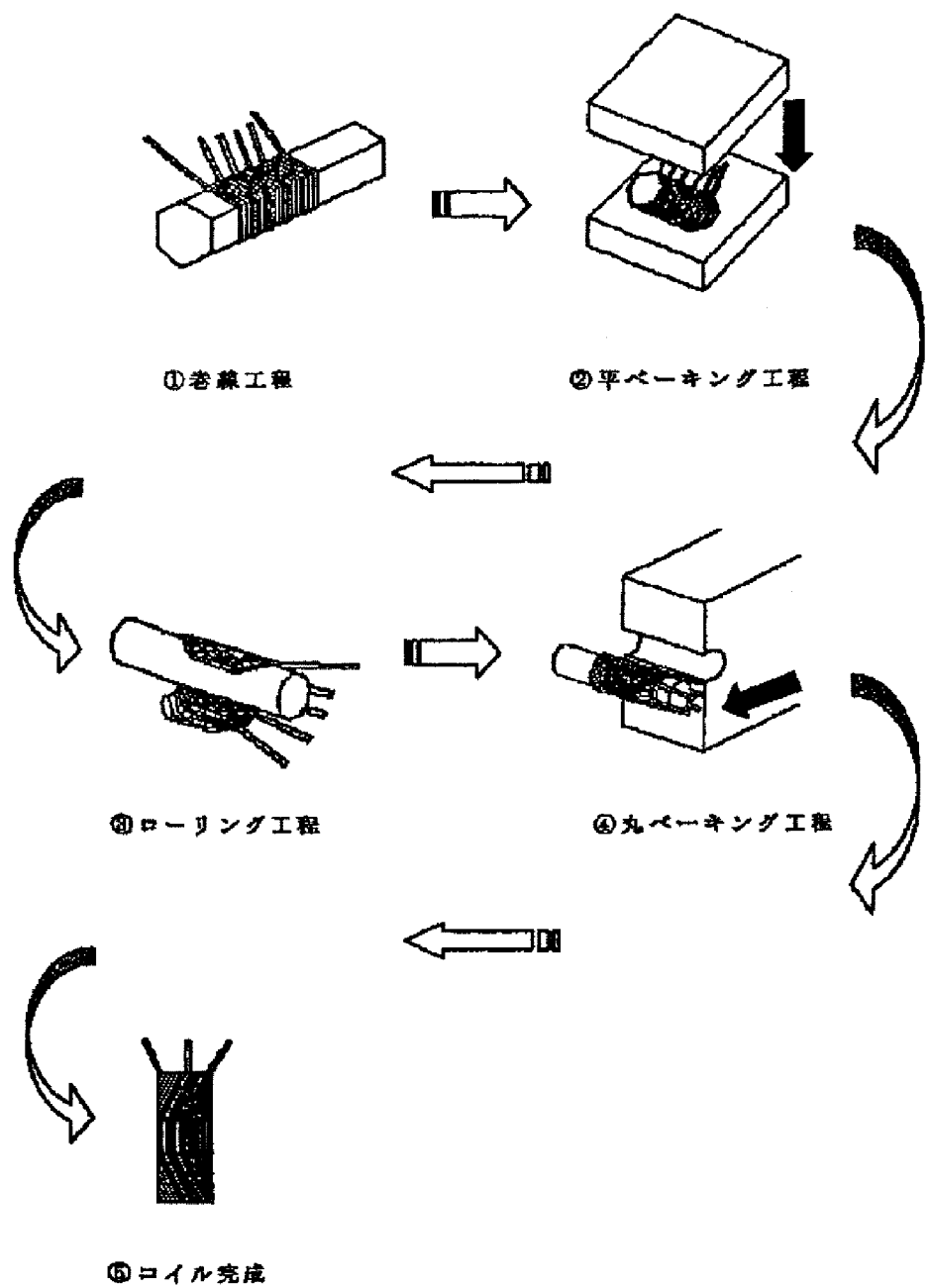
FIG. 3 is a view for explaining a conventional process of forming a coil.
Figure 4:
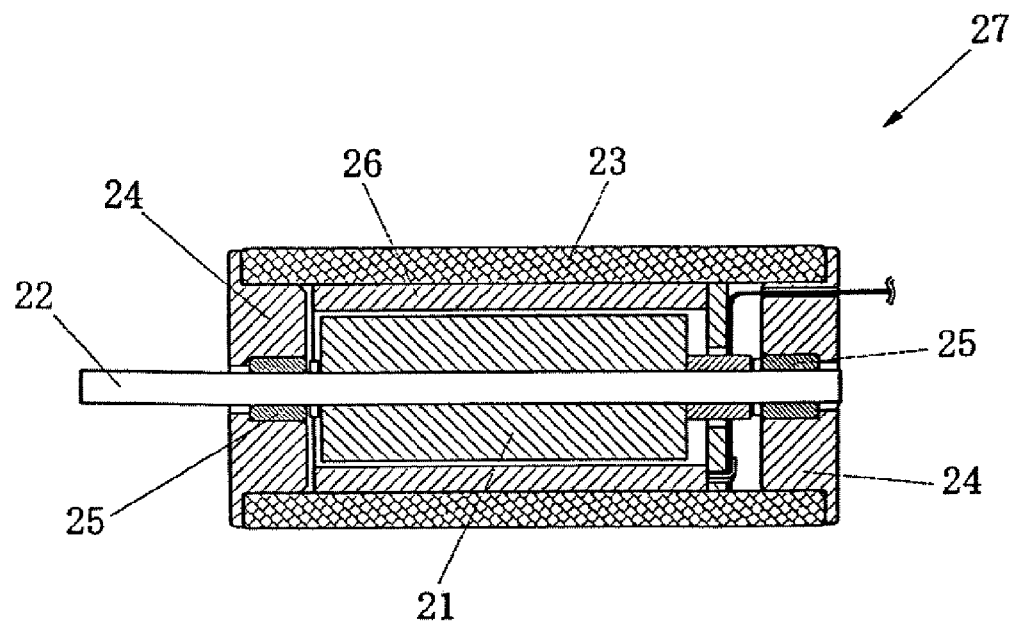
FIG. 4 is a side cross-sectional view illustrating a construction of a conventional DC brushless motor.

1, 4, 8, 9, 11, 14, 16, 19, 20: cylindrical substrate
2: mold
3: protrusion
5, 10: coil pattern groove
6, 12, 17: electroless plating
7, 13: coil pattern
15: through-hole
18: longitudinal wire line
21: magnet
22: shaft
23: housing case
24: flange
25: shaft bearing
26: magnetic field coil
27: DC brushless motor

The invention claimed is:

1. A cylindrical coil, comprising:
 a first cylindrical substrate having a longitudinal axis, and
 a coil pattern groove disposed on the first cylindrical substrate, the coil pattern groove being wound around an axis transverse to the longitudinal axis of the first cylindrical substrate,
 the coil pattern being directly formed from the coil pattern groove on the first cylindrical substrate filled with a conductor,
 wherein the coil pattern is directly formed by forming the coil pattern groove on the cylindrical substrate using a nano-imprinting method and filling the coil pattern groove with the conductor.

2. The cylindrical coil according to claim 1, further comprising:
 a plurality of cylindrical substrates consecutively formed on the first cylindrical substrate,
 a plurality coil pattern grooves, each coil pattern groove being disposed on each of the plurality cylindrical substrates, each coil pattern groove being wound around an axis transverse to the longitudinal axis of the first cylindrical substrate,
 a plurality of coil patterns being directly formed from the plurality of coil pattern grooves filled with a conductor,
 a plurality of insulating layers, each of the plurality of insulating layers respectively coating the coil pattern side of each of the plurality of the cylindrical substrate and the first cylindrical substrate,
 a through-hole filled with a conductor provided on the plurality of cylindrical substrates and the first cylindrical substrate to electrically interconnect the coil patterns, and
 an outermost layer of insulation material being provided on the outer most of the plurality of cylindrical substrates.

3. The cylindrical coil according to claim 1, wherein a width of each of the plurality of the coil pattern is 20 μm or less.

4. The cylindrical coil according to claim 1, further comprising:
 a plurality of cylindrical substrates consecutively formed on the first cylindrical substrate,
 a plurality coil pattern grooves, each pattern groove being disposed on each of the plurality of cylindrical substrates, each coil pattern groove being wound around an axis transverse to the longitudinal axis of the first cylindrical substrate,
 a plurality of coil patterns being directly formed from the plurality of coil pattern grooves filled with a conductor,
 a plurality of insulating layers, each of the plurality of insulating layers respectively coating the coil pattern side of each of the plurality of the cylindrical substrate and the first cylindrical substrate,
 a through-hole filled with a conductor provided on the plurality of cylindrical substrates and the first cylindrical substrate to electrically interconnect the coil patterns, and
 an outermost layer of insulation material being provided on the outer most of the plurality of cylindrical substrates.

5. The cylindrical coil according to claim 1, wherein a width of each of the plurality of the coil patterns is 20 μm or less.

6. The cylindrical coil according to claim 2, wherein a width of each of the plurality of the coil patterns is 20 μm or less.

7. A cylindrical micromotor, comprising:
 a cylindrical coil including:
  a first cylindrical substrate having a longitudinal axis, and
  a coil pattern groove disposed on the first cylindrical substrate, the coil pattern groove being wound around an axis transverse to the longitudinal axis of the first cylindrical substrate,
  the coil pattern being directly formed from the coil pattern groove on the first cylindrical substrate filled with a conductor,
  wherein the coil pattern is directly formed by forming the coil pattern groove on the cylindrical substrate using a nano-imprinting method and filling the coil pattern groove with the conductor.

8. The cylindrical micromotor of claim 7, further comprising:
 a plurality of cylindrical substrates consecutively formed on the first cylindrical substrate,
 a plurality coil pattern grooves, each coil pattern groove being disposed on each of the plurality of cylindrical substrates, each coil pattern groove being wound around an axis transverse to the longitudinal axis of the first cylindrical substrate, a plurality of coil patterns being directly formed from the plurality of coil pattern grooves filled with a conductor, a plurality of insulating layers, each of the plurality of insulating layers respectively coating the coil pattern side of each of the plurality of the cylindrical substrate and the first cylindrical substrate, a through-hole filled with a conductor provided on the plurality of cylindrical substrates and the first cylindrical substrate to electrically interconnect the coil patterns, and an outermost layer of insulation material being provided on the outer most of the plurality of cylindrical substrates.

\* \* \* \* \*